US007260771B2

(12) United States Patent
Chiu et al.

(10) Patent No.: US 7,260,771 B2
(45) Date of Patent: Aug. 21, 2007

(54) INTERNET-BASED SYSTEM FOR MULTIMEDIA MEETING MINUTES

(75) Inventors: Patrick Chiu, Menlo Park, CA (US); Donald G. Kimber, Montara, CA (US); John Steven Boreczky, San Leandro, CA (US); Andreas Girgensohn, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 786 days.

(21) Appl. No.: 09/843,197

(22) Filed: Apr. 26, 2001

(65) Prior Publication Data

US 2002/0161804 A1 Oct. 31, 2002

(51) Int. Cl.
*G06F 15/00* (2006.01)

(52) U.S. Cl. .................... 715/500; 715/500.1
(58) Field of Classification Search ............... 715/530, 715/531, 500, 704, 730, 732, 500.1; 345/730, 345/732
See application file for complete search history.

(56) References Cited

U.S. PATENT DOCUMENTS

| | | | | |
|---|---|---|---|---|
| 4,841,387 A * | 6/1989 | Rindfuss | ................... | 360/72.1 |
| 5,202,828 A * | 4/1993 | Vertelney et al. | ........... | 715/530 |
| 5,535,063 A * | 7/1996 | Lamming | ...................... | 360/4 |
| 5,613,019 A * | 3/1997 | Altman et al. | ............... | 382/311 |
| 5,835,692 A * | 11/1998 | Cragun et al. | ............... | 345/419 |
| 5,894,306 A * | 4/1999 | Ichimura | ................... | 345/418 |
| 5,917,480 A * | 6/1999 | Tafoya et al. | ............... | 345/732 |
| 5,920,317 A * | 7/1999 | Kolster | ....................... | 715/512 |
| 5,970,455 A * | 10/1999 | Wilcox et al. | .............. | 704/270 |
| 5,986,655 A * | 11/1999 | Chiu et al. | .................. | 715/839 |
| 6,161,113 A * | 12/2000 | Mora et al. | .................. | 715/505 |
| 6,182,273 B1 * | 1/2001 | Tarumi | ....................... | 717/101 |
| 6,239,801 B1 * | 5/2001 | Chiu et al. | ................ | 715/500.1 |
| 6,321,158 B1 * | 11/2001 | DeLorme et al. | ........... | 701/201 |
| 6,418,457 B1 * | 7/2002 | Schmidt et al. | ............. | 715/512 |
| 6,452,615 B1 * | 9/2002 | Chiu et al. | ................... | 345/776 |
| 6,493,672 B2 * | 12/2002 | D'Agosto et al. | ....... | 704/270.1 |
| 6,529,920 B1 * | 3/2003 | Arons et al. | ............. | 715/500.1 |
| 6,657,356 B2 * | 12/2003 | Laurent et al. | ............. | 310/254 |
| 6,952,803 B1 * | 10/2005 | Bloomberg et al. | ......... | 715/530 |
| 2001/0034738 A1 * | 10/2001 | Cantwell et al. | ............ | 707/500 |
| 2002/0002562 A1 * | 1/2002 | Moran et al. | ............... | 707/500 |

(Continued)

OTHER PUBLICATIONS

Stifelman, Augmenting Real-World Objects: A Paper-Based Audio Notebook, ACM 1996, pp. 199-200.*

(Continued)

*Primary Examiner*—Cong-Lac Huynh
(74) *Attorney, Agent, or Firm*—Fliesler Meyer LLP

(57) ABSTRACT

A method for creating multimedia meeting minutes is disclosed. In an embodiment, the method receives notations from a user. As each notation is received, context information is recorded with the notation. The context information is used to select pertinent portions of multimedia information received concurrently with the notations. An association is then created between the notation and each selected portion of the multimedia information. These associations may be used to access the selected portions of the multimedia information from the notations. The notations and their respective associations are deposited for future retrieval. The deposited notations may be revised by receiving an altered copy of the notations from a user. The deposited notations are modified in accordance with the altered copy.

19 Claims, 3 Drawing Sheets

U.S. PATENT DOCUMENTS

| | | | |
|---|---|---|---|
| 2002/0010708 A1* | 1/2002 | McIntosh | 707/500 |
| 2002/0038214 A1* | 3/2002 | D'Agosto et al. | 704/270 |
| 2002/0073114 A1* | 6/2002 | Nicastro et al. | 707/500 |
| 2002/0097277 A1* | 7/2002 | Pitroda | 345/854 |
| 2002/0133513 A1* | 9/2002 | Townsend et al. | 707/500.1 |
| 2002/0163548 A1* | 11/2002 | Chiu et al. | 345/864 |
| 2003/0009430 A1* | 1/2003 | Burkey et al. | 707/1 |
| 2003/0036941 A1* | 2/2003 | Leska et al. | 705/9 |
| 2003/0040332 A1* | 2/2003 | Swartz et al. | 455/553 |
| 2003/0123712 A1* | 7/2003 | Dimitrova et al. | 382/118 |
| 2004/0015367 A1* | 1/2004 | Nicastro et al. | 705/1 |
| 2004/0050651 A1* | 3/2004 | Heidel | 194/217 |
| 2006/0107826 A1* | 5/2006 | Knapp et al. | 84/724 |

OTHER PUBLICATIONS

Stifelman, The Audio Notebook Paper and Pen Interaction with Structured Speech, SIGCHI'01, Mar. 31-Apr. 4, 2001, Seattle WA, USA, ACM 2001, pp. 182-189.*

Stiefelhagen et al., Modeling Focus of Attention for Meeting Indexing, ACM 1999, pp. 3-10.*

Nanard et al., Cumulating and Sharing End Users Knowledge to Improve Video Indexing in a Video Digital Library, Conference JCDL '00, May 2000, Virginia.*

Chiu et al., NoteLook : Taking Notes in Meetings with Digital Video and Ink, ACM 1999, pp. 149-158.*

Streitz et al., DOLPHIN : Integrated Meeting Support across Local and Remote Desktop Environments and LiveBoards, ACM 1994, pp. 345-358.*

Gwizdka et al., Electronic Engineering Notebooks: A Study in Structuring Design Meeting Notes, ACM 1998, p. 355-356.*

Whittaker et al., Filochat: Handwritten Notes Provide Access to Recorded Conversations, ACM 1994, pp. 271-277.*

Wilcox et al., Dynomite: A Dynamically Organized Ink and Audio Notebook, ACM 1997, pp. 186-193.*

Geyer et al., Making Multimedia Meeting Records More Meaningful, IEEE 2003, pp. 669-672.*

Lalanne et al. A Research Agenda for Accessing the Utility of Document Annotations in Multimedia Databases of Meeting Recordings, Google 2003, p. 1-8.*

Abowd, Gregory D.; Atkeson, Christopher G.; Feinstein, Ami; Hmelo, Cindy; Kooper, Rob; Long, Sue; Sawhney, Nitin "Nick" and Tani, Mikiya; *Teaching and Learning as Multimedia Authoring: The Classroom 2000 Project*, ACM Multimedia 96, Boston, MA USA 1996.

Bargeron, David; Gupta, Annop; Grudin, Jonathan and Sanocki, Elizabeth; *Annotations for Streaming Video on the Web: System Design and Usage Studies*, Microsoft Research, Redmond, WA USA, Apr. 24, 2001.

Chiu, Patrick; Kapuska, Ashutosh; Reitmeier, Sarah and Wilcox, Lynn; *NoteLook: Taking Notes in Meetings with Digital Video and Ink*, ACM Multimedia 96, Boston, MA USA.

Chiu, Patrick; Foote, Jonathan; Girgensohn, Andreas; and Boreczky, John; *Automatically Linking Multimedia Meeting Documents by Image Matching*; FX Palo Alto Laboratory, 2000.

Davis, Richard C.; Landay, James A.; Chen, Victor; Huang, Jonathan; Lee, Rebecca B.; Li, Francis C.; Lin, James; Morrey III, Charles B.; Schleimer, Ben; Price, Morgan N.; Schillit, Bill N.; *Notepals: Lightweight Note Sharing by the Group, for the Group*; CHI'99 Pittsburgh PA USA.

Moran, Thomas P.; Palen, Leysia; Harrison, Steve; Chiu, Patrick; Kimber, Don; Minneman Scott; van Melle, William; and Zellweger, Polle; "I'll Get that Off the Audio": A Case Study of Salvaging Multimedia Meeting Records; ACM Multimedia 96, Boston, MA USA.

Weber, Karon and Poon, Alex; *Marquee: A Tool For Real-Timevideo Logging*; ACM, Boston, MA, USA 1994.

Minneman, Scott; Harrison, Steve; Janssen, Bill; Moran, Thomas; Kurtenbach, Gordon and Smith, Ian; *A Confederation of Tools for Capturing and Accessing Collaborative Activity*; ACM Multimedia 95—Electronic Proceedings, Nov. 5-9, 1995, San Francisco, CA.

Beverly L. Harrison and Ronald M. Baecker, "Designing Video Annotation and Analysis Systems," Graphics Interface'92, Morgan-Kaufmann, pp. 157-166.

* cited by examiner

INTERNET-BASED SYSTEM FOR MULTIMEDIA MEETING MINUTES

FIELD OF THE INVENTION

The present invention relates to a method for creating multimedia meeting minutes, and an apparatus for implementing same.

BACKGROUND OF THE INVENTION

Documenting a meeting through meeting minutes often plays an important part in organizational activities. Minutes can be used during a meeting to facilitate discussion and questions among the meeting participants. In the period shortly after the meeting, it may be useful to look at meeting minutes to review details and act on decisions. Over the long term, meeting minutes constitute part of the organizational memory, providing a clear record of the organizations goals and accomplishments.

New capabilities enabled by digital multimedia technology provide instant and far reaching communication of a variety of information types. This can include digital representations of traditional presentation materials, such as slides, charts, or diagrams, as well as more advanced digital multimedia formats such as video and audio. Different digital multimedia formats can be used to convey a variety of information. Slides contain text, images and meaningful layout information. Audio and video can pick up details that are difficult to catch, capture gestures, nonverbal activity, and show the context of other information. Internet content may also be employed during a meeting.

In order to better utilize digital multimedia technology, it is desirable to correlate meeting minutes with these various types of digital multimedia information. For example, meeting minutes could be linked to a video recording to retrieve and playback interesting points of a meeting. By working on the Internet, meeting minutes can be created and accessed anywhere.

Despite the advances offered by digital multimedia technology, most people prefer text notes. Text notes, especially when typewritten, are easier to quickly scan and review than audio or video notes. In an attempt to combine the usability of text notes with the richness of digital multimedia information, several different input systems have been developed. These include devices such as the CrossPad, palmtop computers, personal digital assistants (PDAs), pen-based notebook computers, and common laptop computers. Unfortunately, handwriting recognition, user interface design, display technology, wireless interface issues, and battery performance are currently too immature to make note taking practical with pen-based systems. For novice users, only ordinary paper or laptop computers are suitable input devices.

There are few text-based note taking applications designed for recording meeting minutes. WEmacs is a text note taking application based on the GNU Emacs editor. Notes entered into a WEmacs system are instantly "beamed" onto a shared display, such as a Xerox LiveBoard. The LiveBoard is a digital version of a traditional whiteboard. Users can write or draw directly onto the LiveBoard with an input device. The LiveBoard displays graphics corresponding to the motions of the input device. The resulting graphics appear similar to handwritten notes on a traditional whiteboard. Unlike a traditional whiteboard, the contents of the LiveBoard display can be saved as an image file. When used in conjunction with a WEmacs application, the LiveBoard receives additional text notations from the WEmacs application. The LiveBoard displays these additional text notations together with the "handwritten" notations. When the contents of a LiveBoard display contents are saved, the text notations added by WEmacs and the handwritten notations are saved together as part of the same image file.

Because text notations from Wemacs and handwritten notes are merged into a single file, a user cannot access the text notations apart from the handwritten notations. This shortcoming makes WEmacs is ill suited for summarizing the content of a meeting. Additionally, the WEmacs user interface assigns functions to special characters, making its operation more complicated. Starting and ending a session in WEmacs is also complicated.

The Where Were We system (W3), which is related to WEmacs, is another text-based notation system. Unlike WEmacs, W3 supports making annotations to a video recording during a live event. However, W3 does not support other digital multimedia formats commonly used in meetings, such as slides. Like WEmacs, the interface for W3 is also complicated.

The Classroom 2000 system is a PDA note taking system. In this system, slides are pre-loaded into each PDA. These slides are also displayed on a LiveBoard. Note taking is done on the PDA device. This system is not text based and its complexity makes it unsuitable for novices. Since this system requires the use of PDA devices, the overall cost of the system is increased.

There are several systems designed specifically for annotation of video information. These systems allow a user to attach a notation to a portion of a video stream. Examples of such systems are Microsoft™ MRAS, Marquee, and Vanna.

Microsoft™ MRAS a video annotation system based on ActiveX™ technology, which only works in Microsoft Windows™ Internet Explorer™ environment. MRAS is designed for asynchronous annotation of a single multimedia source by large numbers of users. However, MRAS is ill-suited for the task of creating meeting minutes in real time. When a user wishes to add an annotation, the video stream is paused. This makes it unsuitable for adding annotations during a live event, where the video cannot be paused. Additionally, the user interface for MRAS is not designed for use during a live event. MRAS requires the user to manually request to add an annotation. Then, the user must enter the annotation, adjust the timing of the annotation, select a category to organize the annotation, and enter an e-mail address where the annotation will be sent. This process must be repeated for each annotation. Because of the number of steps required to add an annotation to a single multimedia source, MRAS makes it difficult to use in a live setting, where annotations must be added rapidly. Further, MRAS only supports adding annotations to a single multimedia source at a time.

Another video annotation system is the FXPAL Notelook system. The Notelook system is not text based. Users take freeform notes on pen-based computers in digital ink. The digital ink strokes correspond to the user's handwriting. Users can then incorporate images from the video sources of the room activity and presentation material into these freeform notes. The images and digital ink strokes are indexed to the video recording for retrieval. The Notelook system requires training to use and is not designed for novices. The handwritten notes are more difficult to read than formatted text. Further, unlike text, which can be handled by virtually any software application, digital ink strokes require specially adapted software. Additionally, Notelook requires the use of pen based computers; these computers significantly increase the system cost.

Creating multimedia meeting minutes is a difficult challenge. Current multimedia note taking applications face a number of problems. Multimedia note taking applications should be simple to operate. Taking notes in a live event requires the user to pay close attention and sometimes participate in the meeting in addition to formulating notes. This makes it difficult for a user to fiddle with the complex controls associated with a video annotation system, or to perform tasks such as labeling or organizing information.

Additionally, multimedia note taking applications should be easy to learn. Interface devices such as pen-based notebook computers and PDAs require intensive training to be used effectively. Systems with non-intuitive interfaces cannot be widely adopted without training a large number of individuals to serve as designated note takers. This problem is further compounded in meetings held by less technically inclined individuals. Although multimedia note taking can benefit any type of meeting, less technically inclined individuals will be reluctant to use a non-intuitive note taking application.

Further, multimedia note taking applications should support rapid interaction. A user may have to make a number of different notations within a relatively short time frame during the meeting. In video annotation systems, the video can be paused and replayed, giving users ample time to operate a relatively complicated user interface and to perform labeling or organizing tasks. In contrast, a live meeting cannot be held up to allow a note taker to finish processing notations. Because note taking applications with non-intuitive or complex interfaces will hinder a users efforts to enter notes rapidly, they are impractical for real time note taking. Therefore, note taking applications should be able to quickly receive and process a number of notations in rapid succession.

Multimedia note taking applications should also support a large number and variety of multimedia formats. During a meeting, multimedia information can be introduced in a variety of formats, such as audio, video, slides. Note taking applications such as WEmacs have sparse support for different multimedia formats. Moreover, a number of different multimedia formats may be used simultaneously during a meeting. For example, in a video conference, video sources at each location record the participants. In conjunction with multiple video sources, presentation materials may also be used. Video annotation systems such as MRAS are only capable of handling one multimedia source at a time. Such a system is ill-suited for simultaneously attaching notations to many different multimedia sources. Therefore, it is desirable to have a multimedia note taking application adept at handling a large number of multimedia sources in a wide variety of multimedia formats.

Portability is another concern for multimedia note taking applications. Many current applications are limited to a specific operating environment. For instance, WEmacs is primarily designed for a UNIX environment. MRAS depends on technology proprietary to the Microsoft Windows™ operating system and the Microsoft Internet Explorer™ web browser. Additionally, many systems require exotic input and display hardware. These restrictions severely limit the widespread deployment of current note taking applications.

Therefore, it is desirable to have a multimedia note taking application which is simple to operate, is easy to learn, allows rapid interaction, supports a number of different multimedia formats simultaneously, and is easily deployed on a wide range of operating environments.

SUMMARY OF THE INVENTION

In accordance with the present invention, a multimedia note taking application addresses the shortcomings of the previous applications in a number of ways. First, the note taking application is simple to operate. In an embodiment, the note taking application runs inside of a Web browser on an ordinary laptop computer. During the meeting, the user can enter a plurality of notations in a single, simple text window, similar to a word processing or text editing application. This embodiment of the note taking application automatically formats each notation and includes hyperlinks to appropriate multimedia content. Because this embodiment of the note taking application allows the user to enter many notations into a single text window and automatically formats the notations, it is simple to operate.

Second, this embodiment of the note taking application is very easy to learn. Because this embodiment of the invention automates the linking of notations to multimedia information, there are no special keys or functions required to operate this embodiment. Therefore, this embodiment of the invention is easy for users to learn.

Third, the highly automated nature of this embodiment of the invention allows the user to rapidly enter notations. This feature allows the note taker to easily follow and even participate in the meeting, all while still taking notes.

Fourth, this embodiment of the note taking application supports a virtually unlimited variety of multimedia formats. In this embodiment, the system employs a distributed multimedia environment. Instead of the multimedia information being handled directly by the note taking application, the multimedia information multimedia information is divided between several different computers and/or software applications adapted to handle one or more specific multimedia formats. Since the task of handling multimedia information is distributed to external applications specifically adapted to each multimedia format, the note taking application itself is not limited in its support of different multimedia formats.

Fifth, this note taking system is highly portable. Unlike other systems which rely on proprietary operating systems or exotic input or display hardware, an embodiment of the note taking application of the present invention has been implemented as Java™ applet. Because Java™ is a hardware independent operating environment, this embodiment of the note taking application runs on any system that includes a Java™ enabled web browser. This can include desktop or notebook computers, personal digital assistants, or even specialized thin-client network appliances.

According to the invention, roughly described, a method for creating multimedia minutes receives notations from a user and automatically associates each received notation with the appropriate portions of different types of multimedia information. In an embodiment of the method, a plurality of notations from a user are recorded during a meeting while multimedia information is received from multimedia sources. The method then creates an association between each of the recorded notations and selected portions of the multimedia information from one or more multimedia sources based on context information recorded with each notation. These associations between the selected portions of multimedia information and the recorded notations are embedded into the recorded notations. The recorded notations and their respective embedded associations are then stored for future retrieval. A copy of the stored notations may be transmitted to the user via electronic mail for review.

An additional embodiment of the invention includes a method for automatically revising the stored notations. In this embodiment of the method, the user revises the notations within an electronic mail application. The user then forwards the revised notations to other individuals via electronic mail. The method automatically receives a copy of the forwarded revised notations via electronic mail. The received notations are then compared with the previously stored notations, and the stored notations are updated accordingly.

Other embodiments and advantages of the present invention can be seen upon review of the figures, the detailed description, and the claims which follow.

BRIEF DESCRIPTION OF THE FIGURES

The present invention will now be described with reference to the drawings, in which.

The invention will be better understood with reference to the drawings and detailed description below. In the drawings, like reference numerals indicate like components.

DETAILED DESCRIPTION

Figure 1:
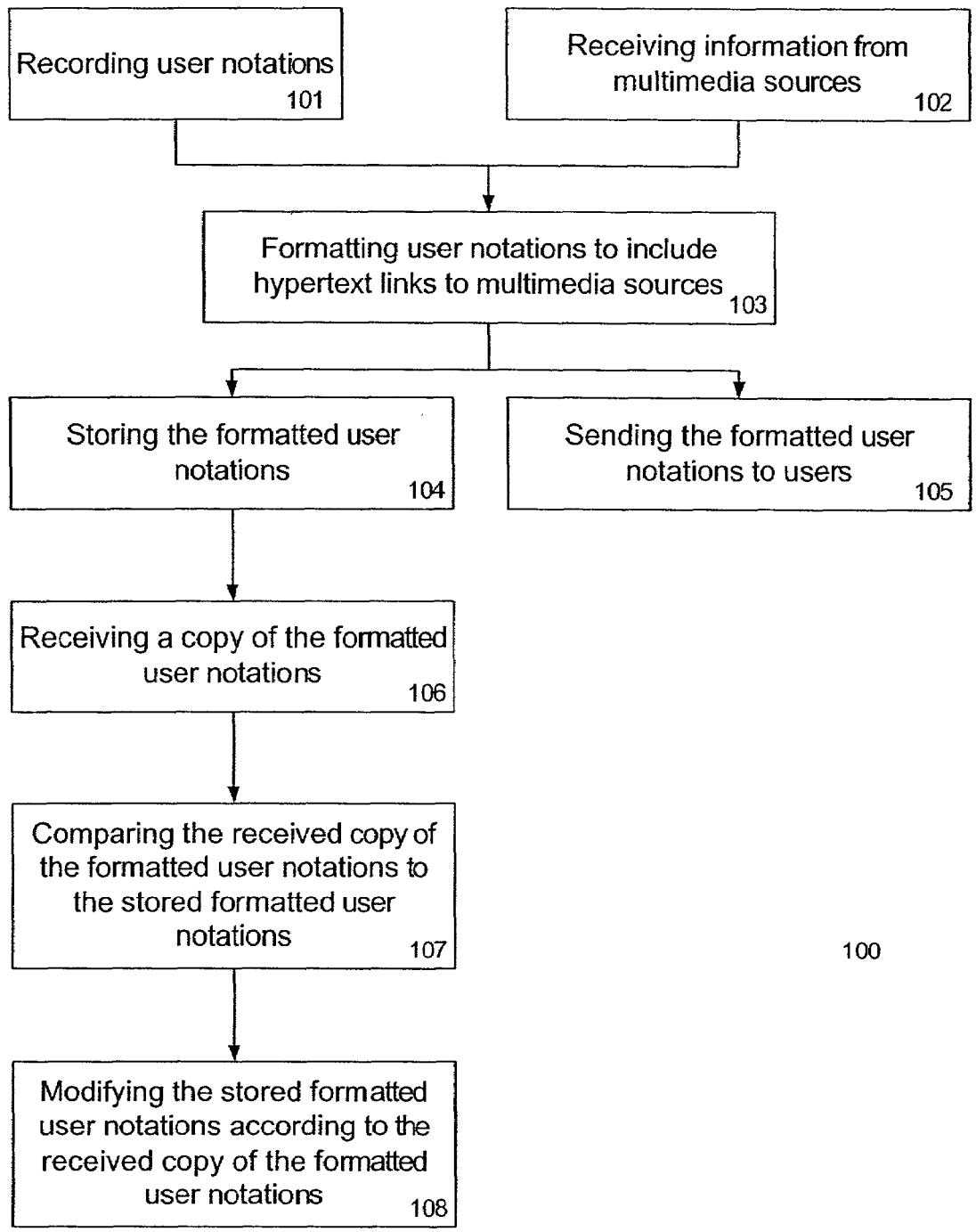
FIG. 1 illustrates an embodiment of a method of the present invention.

FIG. 1 shows an embodiment 100 of the method of the present invention. This method is comprised of the following steps. First, the method 100 records a series of user notations in step 101. These notations are user comments related to a particular aspect of a meeting. In an embodiment, the notations may be text notations typed by a user. The notations may be made using a laptop computer equipped with a keyboard or other type of input device. The text notations may be displayed in a window on the screen of the laptop computer as they are input into the system, with a cursor indicating the position of the most current text input. The end of a particular text notation is signified by moving the cursor to the next line. This can be done by entering a carriage return, a new line character, or any other commonly used method for moving a cursor to a new line.

In addition to recording the user notations, step 101 may also record contextual information associated with each notation. An example of this type of contextual information is a timestamp, a piece of information marking the time in which each notation is received by the system. The timestamp may be encoded as text information and inserted into the relevant user notation, where it can be perceived by the user, or the timestamp associated with a user notation may be stored internally out of view of the user.

Simultaneous to the step of recording user notations 101, the method 100 also receives information from multimedia sources 102. These multimedia sources can include audio information, video information, text information, animated or still images, three dimensional computer models, slides, charts, screen displays from other software applications, or any other audio/visual information that can be processed by computer. These multimedia sources can provide multimedia information in discrete, self-contained quantities of data or as a constant "stream" of data. The latter type of multimedia information is particularly suited for audio or video recordings of a live, ongoing event. In an embodiment, the multimedia information may include format information specifying the type of multimedia information produced by each multimedia source.

In step 102, the information received by method 100 from multimedia sources can be the multimedia information itself, or in an embodiment, secondary information enabling access to multimedia information located externally. The secondary information contains instructions for locating and accessing multimedia information produced by a multimedia source. The secondary information may be produced by the multimedia source or by another application. Hyperlinks are a well known type of secondary information. Methods of using hyperlinks to retrieve virtually any of type multimedia information are well-known in the art. Further, the use of hyperlinks employing the HTTP protocol are widely used to retrieve multimedia information over an electronic network. Secondary information may also occur in the form of a file path. A file path may be used to describe the location of a data file within a file system. File systems are a well known method of organizing information on data storage devices associated with computers or other types of electronic devices. Multimedia information stored in a data file within a file system may be accessed via a file path describing the location of the data file.

In an embodiment of step 102, the secondary information from a multimedia source is adapted to be easily converted by method 100 into a hyperlink to multimedia information processed by the multimedia source. This secondary information can be formatted as hyperlink itself, or as a data structure containing information on accessing the multimedia information.

The system can receive this multimedia information or secondary information from the multimedia sources in a variety of ways. This includes well-known methods for communicating information between applications within a computer or distributed over an electronic network, such as operating system specific messaging services and electronic networking protocols.

In one embodiment of method 100, the system receives secondary information describing all of the available multimedia sources via a metadata stream. A metadata stream is a source of secondary information which describes the location, properties, and other characteristics of all of the active multimedia sources. The metadata stream may be sent to the system as a continuous transmission, a periodic transmission, or other types of transmissions known in the art. The metadata stream is created by monitoring the status of all of the multimedia sources. This monitoring may be performed by a separate software application. When the location, properties, or other characteristics of a multimedia source are changed, the metadata stream is updated with secondary information to reflect this change. In this manner, the system receives secondary information regarding all of the multimedia sources.

An embodiment of method 100 receiving secondary information instead of multimedia information has the advantage of reduced processing and storage requirements and easy adaptation to a variety of multimedia formats. Secondary information is generally smaller and less complicated than its corresponding multimedia information. This results in reduced processing and storage requirements for an embodiment of the invention using secondary information. Further, this embodiment may receive this secondary information encoded in a standardized format, such as HTML. By employing a standardized format for receiving information from multimedia sources, this embodiment of the system is capable of handling secondary information from a wide variety types of multimedia sources.

Following the step of receiving information from multimedia sources 102, the method 100 of the present invention formats the user notations to include hyperlinks to the relevant multimedia sources at step 103. Step 103 formats the user notations by first comparing each of the user notations to the information received from the multimedia sources. The user notations and the multimedia information are analyzed in order to correlate the notations to one or more appropriate multimedia sources.

In an embodiment, step 103 correlates user notations with multimedia information by examining the context information associated with each notation. If the context information is a timestamp, the system selects multimedia information from each multimedia source corresponding to the time when each notation was recorded. The selected multimedia information from each multimedia source is then correlated with the corresponding user notation.

In another embodiment of the correlation portion of step 103, format information specifying the type of each multimedia source is employed in conjunction with the context information associated with each notation in order. For example, if the context information is a timestamp and the multimedia format is a slide, then the system will select the most recent slide displayed up to the time of the timestamp. This slide will be selected regardless of whether it was displayed just before the notation was recorded or several minutes earlier. However, if the multimedia format is a video stream, then the system will select a portion of the video corresponding to the time when the notation was recorded.

Once a notation is properly correlated with one or more multimedia sources, step 103 creates hyperlink between the notation and each of the correlated multimedia sources. This hyperlink may be directed toward all or a selected portion of the multimedia information received from a multimedia source. In embodiments where the multimedia source produces a continuous "stream" of information, the hyperlink may be directed towards a selected portion of the multimedia information corresponding to the time when the correlated notation was entered by the user.

The hyperlink may be created from the multimedia information received in step 102. In an embodiment where secondary information is received in step 102, this hyperlink may be created from the secondary information. In an alternate embodiment, the hyperlink may be created from a combination of the secondary information and the multimedia information. An example of this alternate embodiment would be embedding a small "thumbnail" image into a hyperlink directed towards a still or moving image. This "thumbnail" image is a visual summary of the multimedia information.

Once a hyperlink has been created, step 103 further includes inserting the hyperlink into the notation. If there are several multimedia sources correlated to a single user notation, then multiple hyperlinks, one for each correlated multimedia source, may be created and inserted into the notation. The quantity of hyperlinks and the multimedia sources referenced by the hyperlinks may vary with each notation.

In an embodiment, the hyperlinks appear as additional descriptive text at the end of the notation. The text serves to direct the user reading the notation to the appropriate multimedia content. For example, a hyperlink directed towards an image of a slide may appear at the end of a notation as the word "Slide." In an alternate embodiment, a "thumbnail" image or icon may replace the word "Slide."

Users can access the appropriate multimedia content by selecting the hyperlink in the notation. Following the above example, a user selecting the hyperlink marked "Slide" will retrieve the image of a slide. In other embodiments, a hyperlink may be directed to a video or audio clip. In these embodiments, the appearance of the hyperlink in the notation will be changed accordingly. Selecting this hyperlink will retrieve the appropriate video or audio clip.

In addition to inserting hyperlinks into the notations, step 103 may also perform additional formatting on each of the user notations to make it more legible or to provide additional information. This additional formatting may include the changing the color, size, or style of the text notation. In an embodiment, the formatted notations, which including both the text entered by the user and the inserted hyperlinks, are encoded in HTML.

Following the completion of the formatting step of 103, the method of 100 stores the formatted notations in step 104. The purpose of this step is to enable future retrieval by one or more users of the notations. This allows meeting attendees to review details or assignments after the meeting. It also allows individuals who missed a meeting to stay informed. Over the long term, the stored notations serve as an organizational memory and chronicle the plans and accomplishments of the organization.

The method of storing the formatted notations will vary according to desired means of retrieving stored notations. This storage process 104 may include depositing the formatted notations, include the corresponding hyperlinks, onto a processor readable storage medium. Users may then access the stored notations through a computer or other electronic information retrieval device in communication with this processor readable storage medium. In an embodiment, the formatted notations are capable of being retrieved as one or more HTML encoded web pages. In this embodiment, the step 104 may include converting the formatted notations into one or more HTML encoded web pages for future retrieval. Methods for converting text into HTML encoded web pages are well known in the art. Alternatively, step 104 may store the formatted notations without modification. This may occur if step 103 has already encoded the formatted notations in HTML, or if the conversion to HTML is to be performed upon retrieval of the formatted notations.

In addition to storing the formatted notations in step 104, step 105 may send the formatted notations to one or more users, including the original note taker. The recipients of the formatted notations may review the notations to ensure accuracy and clarity. If necessary, a user may revise the formatted notations. Once the notations have been appropriately revised, the user may forward them to other individuals interested in the meeting notations. This can include the attendees of the meeting, interested parties not present at the meeting, or other individuals in charge of maintaining organizational records.

Step 105 may transmit the formatted notations to a user through means commonly used for transmitting electronic documents. In an embodiment, this includes electronic mail systems. Electronic mail systems which handle messages in plain text format or in HTML encoded text are well known in the art. One type of electronic mail system follows the SMTP protocol. Most organizations are equipped with electronic mail systems.

By using electronic mail to transmit the formatted notations, this embodiment leverages an organization's existing document routing system. The formatted notations are deposited with the user in the same manner as other correspondence. Additionally, receiving the formatted notations via email reminds the user to review the notations. The user can forward the formatted notations via e-mail to other individuals for additional review. If the user chooses to revise the formatted notations, the revision is handled within the electronic mail application in the same manner as other electronic mail messages. This allows method 100 to mesh smoothly with existing work processes and eliminates the need for substantial training.

An embodiment of method 100 may automatically incorporate user revisions into the formatted notations previously stored in step 104. User revisions may include the correction of typographical errors or the revision of text of the formatted notations to ensure accuracy or clarity. This process of automatically incorporating the user revisions into the stored formatted notations is shown in steps 106, 107 and 108. In step 106, the system receives a copy of the formatted notations from a user. This copy of the formatted notations may be from one of the users selected in step 105, or from a user who received a forwarded copy of the formatted notations from another user.

In an embodiment, step 106 receives a copy of the formatted notations through a Web-based application. A Web-based application is a software application designed to operate within a web browser. Web-based applications can be implemented in a variety of ways, including operating environments such as Java™ or ActiveX, or as a combination of HTML and various scripting languages, such as Javascript or Perl, well known in the art. Additionally, the Web-based application may interact with other software applications executed by the web server.

In an embodiment of the step 106 employing a web-based application, the formatted notations are displayed in a Web-based application. The user may modify the displayed notations to incorporate revisions or corrections. This modification may be facilitated through a HTML encoded web page containing a form-based user interface, or an application designed to run within a web browser. An example of the latter is an application written as a Java™ applet. After the user finishes the desired modifications, the Web-based application transmits a copy of the revised formatted notations to step 106. Alternatively, the Web-based application may only transmit the modified portions of the formatted notations to step 106.

In an alternate embodiment of step 106, method 100 receives the user revisions via electronic mail. In this embodiment, method 100 is interfaced to the electronic mail system via an electronic mail mailbox. This mailbox has an electronic mail address, just like any other electronic mail user. Electronic mail sent by users to the electronic mailbox of method 100 will be received by step 106 and available to method 100 for further processing. Methods of interfacing systems with an electronic mail application are well known in the art.

In this embodiment, the user revises a copy of the formatted notations within their own electronic mail application. This copy of the formatted notations may have been sent to the user in step 105. After completing the revisions to the formatted notations, the user forwards the revised user notations to step 106 via electronic mail. This can be accomplished by the user manually addressing a copy of the formatted notations to the electronic mail address of the system's electronic mailbox.

In an alternate embodiment, the electronic mail address of the electronic mailbox is automatically included with the formatted notations sent to the user via electronic mail in step 105. This electronic mail address is included in the message header information, which is used by electronic mail applications to route the electronic mail messages. For example, the electronic mail address may be included in the <cc:> field of the message header. When the user forwards the revised formatted notations to other individuals via electronic mail, the user's electronic mail application will automatically send a copy of the revised formatted notations to every address listed in the <cc:> field of message header, including the electronic mail address of step 106. Every time the revised formatted notations are forwarded by other users, step 106 will receive another copy of the formatted notations. In this manner, method 100 receives a copy of the revised formatted notations.

Once a copy of the formatted notations is received in step 106, the step 107 examines the received copy and compares it with the formatted notations previously stored on the processor readable storage medium. The purpose of this comparison is to determine whether the received copy of the formatted notations is a revised version of the formatted notations. In an embodiment employing a Web-based application, step 107 compares the text of the received version of the formatted notations with the formatted notations stored in step 104. By looking for minor differences in the text between the two sets of notations, step 107 is able to recognize revisions to the formatted notations. Further, step 107 may use a timestamp, if included with the formatted notations, to match corresponding sections of the two sets of notations. Step 107 may then look for minor differences in the text of each section, rather than the entire set of notations. This increases the efficiency of comparison step 107.

In an embodiment where step 106 receives revisions via electronic mail, this recognition of revisions in step 107 may be assisted by examining the header information of the electronic mail message. For example, the header information may identify the sender of the received formatted notations. This can be used to determine whether the received formatted notations were sent by the original note taker. In this situation, the received formatted notations are likely to contain revisions. Conversely, if the received formatted notations did not originate from a user who received formatted notations in step 105, then the received copy of the formatted notations may be an extraneous copy produced by successive users forwarding the formatted notations to other individuals. In this situation, the step 107 may ignore the received copy of the formatted notations. Following this optional initial examination of the message header information, step 107 compares the text of the received version of the formatted notations with the text of the previously stored formatted notations, as described above, in order to recognize revisions to the formatted notations.

In a further embodiment of step 106 where revisions are received via HTML-encoded electronic mail, this recognition of revisions in step 107 may be assisted by comment information embedded in the HTML source code. Programmers use comment information to assist in writing HTML source code. Web browsers and electronic mail applications ignore the comment information when processing HTML source code. In this embodiment, HTML comments delineate and describe each of the formatted notations. The system inserts HTML comments between each of the formatted user notations to signify the end of a previous notation or the beginning of the next notation. This may be done in step 103 or in step 105. Each HTML comment may contain information identifying the notation. This information may include the meeting in which the notes were taken, the device which recorded the user notation, or the name of the note taker. The latter two types of information may be used when there are multiple note takers in a single meeting.

Once the comparison step 107 has been completed, step 108 of modifying the stored formatted notations is performed. Step 108 replaces selected portions of the text of the stored formatted notations with the revisions identified in step 107. Once the revisions from the received formatted notations have been incorporated into stored formatted notations, the formatted notations, including the revisions, are stored on a processor readable storage medium, in a manner similar to step 104.

Figure 2:
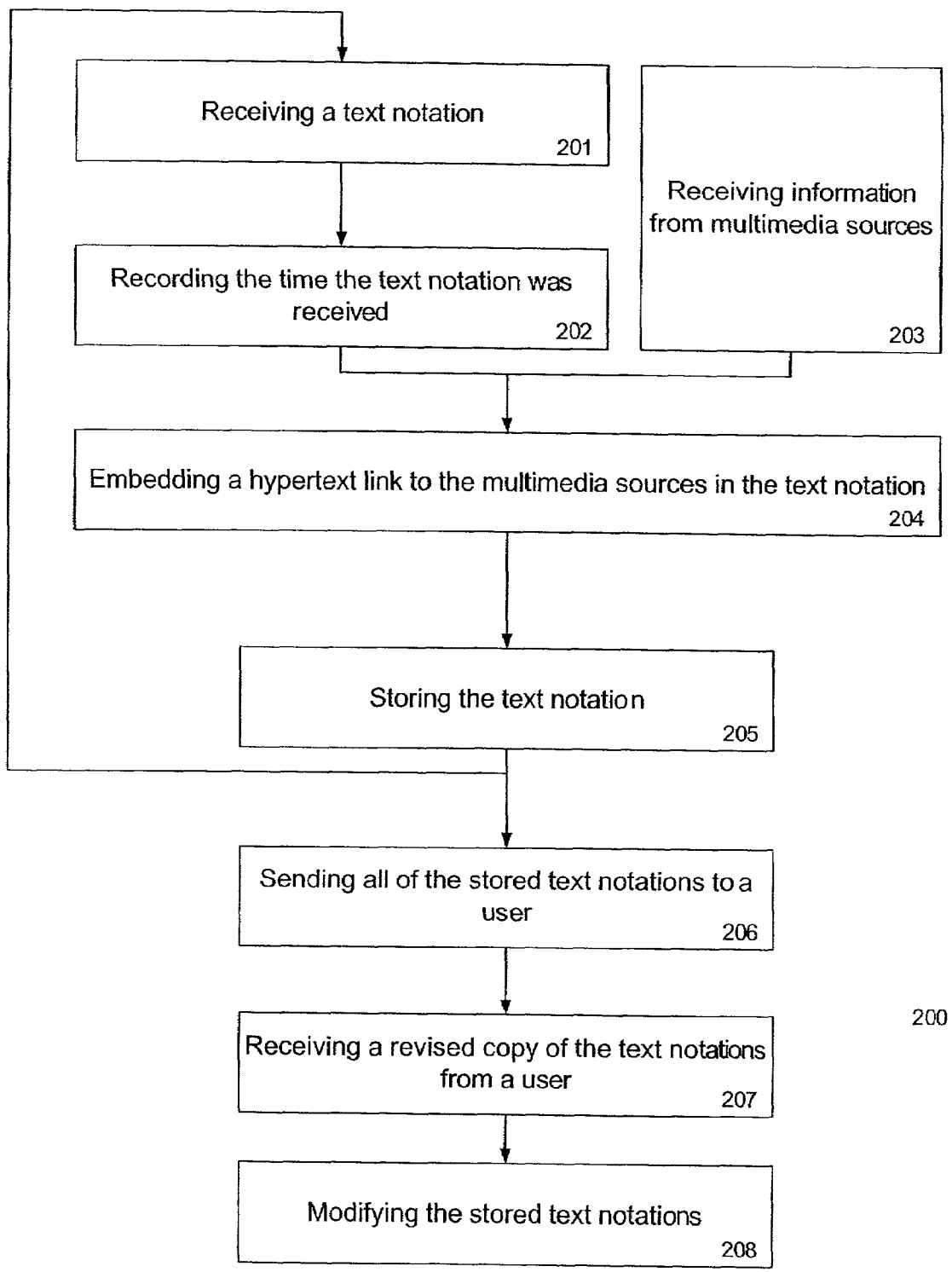
FIG. 2 illustrates an embodiment of a method of the present invention.

A second embodiment 200 of the invention is shown in FIG. 2. In a first step 201, embodiment 200 receives a text notation from a user. This text notation describes a particular aspect of an ongoing meeting, such as a topic of discussion, a question from other participants, or a visual aid. In an embodiment, the user enters the text using a notebook computer in communication with embodiment 200. In an embodiment, the user may end each text notation with a carriage return or new line character to indicate to the system that a text notation has been entered.

Upon receiving a text notation in step 201, step 202 automatically records the time that the text notation was received. In an embodiment, the time information associated with each text notation may be recorded as a timestamp. This time information may be used to index and categorize the text notation. This time information is also used in order to reference the appropriate multimedia sources in later steps.

Simultaneously to performing steps 201 and 202, step 203 receives information from multimedia sources. This information from multimedia sources can be the multimedia information itself, or secondary information employed by the system to access multimedia information at an external location. The types of multimedia sources in step 203 can include video information, audio information, still images, or slides. In order to aid step 203 in handling a wide variety of types of multimedia information, in an embodiment, step 203 receives format information specifying the type of multimedia information produced from each multimedia source. During the course of a meeting, the number and type of multimedia sources may fluctuate as meeting participants add or remove multimedia information. In an embodiment, step 203 receives information concerning the addition or subtraction of multimedia sources during the course of a meeting.

After a text notation has been received and the appropriate time has been recorded according to steps 201 and 202, the embodiment 200 will proceed with step 204, embedding hyperlinks to the multimedia sources in the text notation. In this step, the time information associated with the text notation is compared with the information received up to that point in time from all of the multimedia sources. This comparison determines if any of the multimedia information is pertinent to the text notation. Step 204 then embeds hyperlinks in the text notation to pertinent multimedia information.

In an embodiment, the comparison of step 204 may be based in part on the information about the format of the particular multimedia source. For example, if the type of a particular multimedia source is video information, then step 204 will use the time information combined with the information from the multimedia source to create a hyperlink associating the text notation with the time in the video information corresponding to the time of receipt of the text notation. In another example, if the type of a multimedia source is a slide or other still image, then step 204 will create a hyperlink associating the text notation with the slide image corresponding to the time of receipt of the text notation, or alternatively, with the most recent slide presented prior to that point in time.

Step 205 consists of storing the received text notation and its associated hyperlink on a processor readable storage medium. This enables this text notation to be retrieved for future reference. Following step 205, embodiment 200 may optionally repeat steps 201, 202, 203, 204 and 205 to process additional text notations. Alternatively, once all text notations have been received and the meeting is over, embodiment 200 will proceed to step 206. In an alternate embodiment, a predetermined user input indicates to the system that the meeting has concluded. Upon receiving the predetermined user input, the alternate embodiment proceeds to step 206.

In this embodiment 200 of the method of the invention, the system processes a text notation in steps 201, 202, 203, 204, and 205 before receiving another text notation.

The iterative processing of text notations in this embodiment allows embodiment 200 to update the stored text notations recorded during the meeting. This feature allows a user, either the note taker or another individual, to refer to text notations or multimedia information from earlier in the meeting. In such a situation, a user can search the stored collection of text notations and their associated hyperlinks for the text notation of interest from a previous point in the meeting. Upon finding the text notation of interest, a user may instantaneously access any multimedia information associated with this text notation. This feature is particularly useful in addressing questions from other attendees during the meeting or in recalling a topic of discussion after a meeting gets sidetracked.

Following the completion of the meeting where all of the text notations have been entered by a user, embodiment 200 will then perform step 206 consisting of sending all of the stored text notations previously stored by step 205 to a user. This user can be the original note taker during the meeting or another user whose job is to supervise and revise the notations. The method of sending the stored text notation can be any of several well known in the art. In an embodiment of step 206, this method employs an electronic mail network to send the stored text notations and their associated hyperlinks to a user in the form of electronic mail message. In another embodiment, this method creates a web page containing all of the stored text notations and their associated hyperlinks. This web page can then be accessed by a user through a web browser.

Following the completion of step 206, this embodiment 200 of the method is able to revise the stored text notations from a user. This process begins with step 207, when embodiment 200 receives a revised copy of the text notations from a user. Alternate embodiments of step 207 have the system receiving a revised copy of text notations through electronic mail or through a web page specifically designed for a user to edit and revise the text notations. The electronic mail and web page embodiment of this step can be implemented in the manner similar to those discussed in step 206.

In an embodiment where the revised notations are received through electronic mail, the system includes a predetermined electronic mail address in the reply or cc: field of the electronic mail sent in step 206. When a user forwards this revised copy of the text notations via electronic mail to other interested parties, step 207 will automatically receive a copy of these revised notations.

Once step 207 has received the revised copy of the text notation, step 208 calls for modifying the previously stored text notations of step 206 in accordance with the revised copy received from a user in step 207. In an embodiment, step 208 compares the text notations previously stored in step 206 with the text notations received in step 207. By looking for differences between these two versions of the text notations, step 208 is able to determine how to update the stored version of the text notations. In an embodiment, step 208 may also look at other factors. These factors may include the sender of the revised copy of text notations received from a user in step 207, the time in which the revised text were received in step 207, or specific instructions directed towards instructing the system in step 208 to modify the stored text notations in a particular manner.

Figure 3:
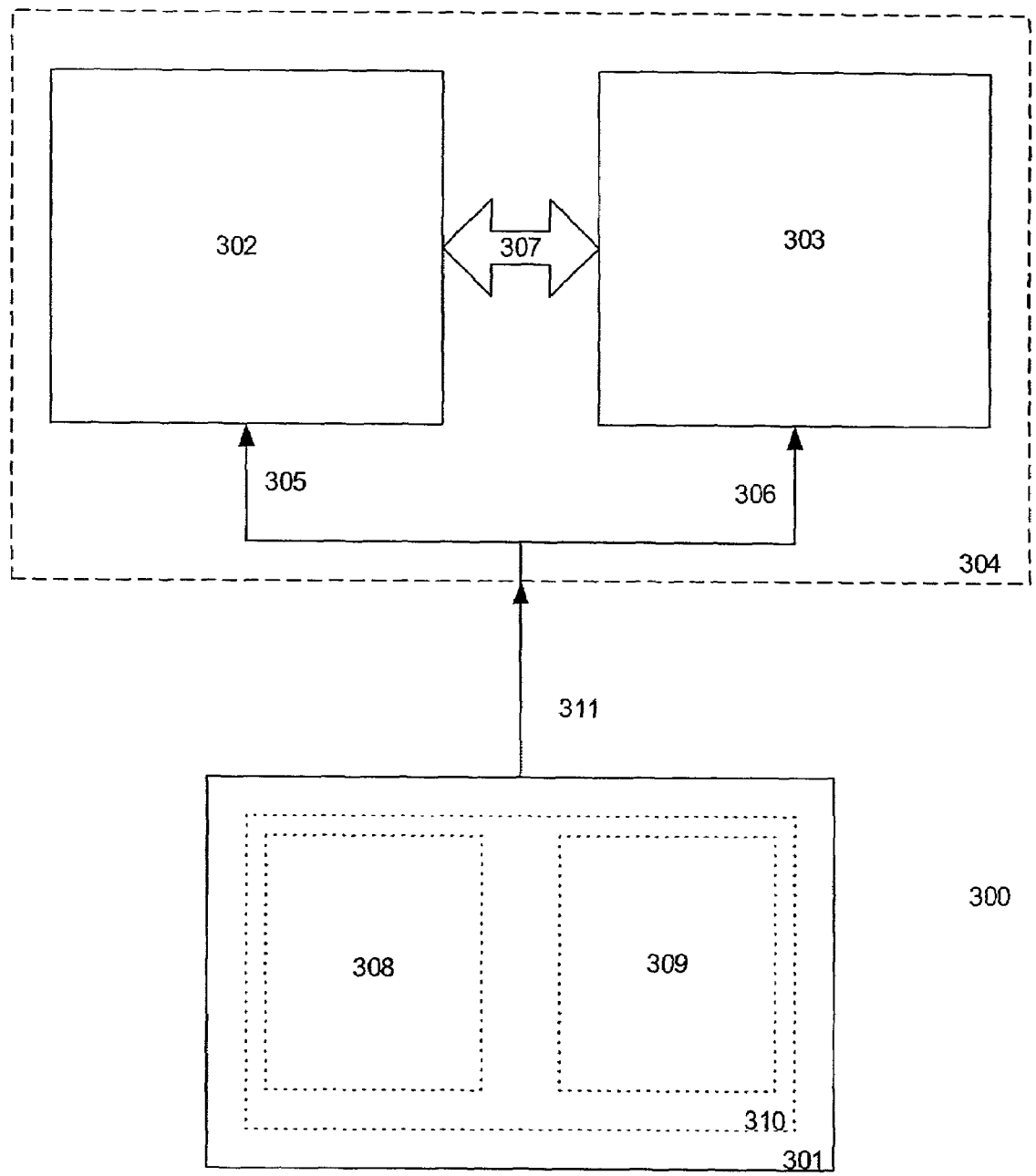
FIG. 3 illustrates an embodiment of a system for performing a method of the present invention.

FIG. 3 shows a system 300 implementing an embodiment of the method of the present invention. This system contains an apparatus 301 adapted to direct a programmable device 304 to perform the method of the present invention. In an embodiment of system 300, the programmable device 304 performs the steps of embodiment 100 or 200 of the method of the present invention. In this embodiment, the apparatus 301 is interfaced to a programmable device 304 via a communication link 311. Communication link 311 may a connection through a local or wide area computer network, or, in an alternate embodiment, an electronic data bus adapted to carry information from the apparatus 301 to programmable device 304.

Apparatus 301 contains a set of processor readable instructions 310. Apparatus 301 transmits the set of processor readable instructions to the programmable device 304 via communication link 311. The set of processor readable instructions 310 is adapted to direct one or more processors contained within a programmable device to perform the method of the present invention.

In an embodiment, system 300 implements the method of the present invention in the form of a client-server architecture. In this embodiment, the programmable device 304 contains two processors, 302 and 303, adapted to execute the set of processor readable instructions 310. It is understood that each processor may be a general purpose computer, or a portion thereof. One of ordinary skill in the art would understand that FIG. 3 and the below description encompasses multiple types of computers as well as other devices capable of processing information.

The client-server embodiment of system 300 distributes the steps of method of the present invention between client processor 303 and server processor 302. These processors 302 and 303 are in communication with each other through communication link 307. An embodiment of communication link 307 is a connection through a wide area network such as an Internet connection. Alternate embodiments of communication link 307 are connections through a local area network, or a combination of one or more local area networks and one or more wide area networks. In these embodiments, the connections for communication link 307 can be made through wired or wireless communication technology. Additionally, Apparatus 301 communicates the processor readable instructions to processors 302 and 303 through communication links 305 and 306 in a manner similar to communication links 307 or 311.

In a client-server embodiment of system 300, the steps of the method of the present invention may be distributed in a number of ways. For example, in an embodiment of system 300 implementing method 100, client 303 may perform step 101 of method 100. The remaining steps of method 100 would be performed by the server 302. In this example, step 101 would further include transmitting the plurality of user notations recorded in step 101 to server 302 via communication link 307. In an example of an embodiment of system 300 implementing method 200, client 303 may perform steps 201 and 202. The server 302 would perform steps 203, 204, 205, 206, 207 and 208. In this embodiment, steps 201 and 202 further include the steps of transmitting received text notations and the time information to the server 302 via communication link 307. The above examples illustrate two different ways of distributing the steps of the method of the present invention between a client processor 303 and a server processor 302. Other distributions between the client processor 303 and server processor 302 may be used to implement the method of the present invention. Depending upon the distribution of steps between the client 303 and server 302 processors, additional steps of transmitting information between the client processor 303 and the server processor 302 may be required.

In the client-server embodiment of system 300, the set of processor readable instructions 310 is further divided into subsets of processor readable instructions 308 and 309. The first subset of processor readable instructions 308 directs server processor 302, to perform a portion of the method of the present invention. The second subset of instructions 309 directs client processor 303 to perform the remaining portion of the method of the present invention. Apparatus 301 transmits instruction subset 308 to server processor 302 via communication link 305 and instruction subset 309 to client processor 303 via communication link 306.

In an alternate embodiment of system 300, communication link 306 is eliminated. Apparatus 301 is interfaced to programmable device 304 via communication link 311, which further communicates both subsets of processor readable instructions 308 and 309 to the server processor 302 via communication link 305. Communication link 307 is used to further relay the second subset of processor readable instructions 309 from server processor 302 to client processor 303. In a further embodiment, the first subset of processor readable instructions 308 may include additional instructions directing server processor 302 to transmit the second subset of processor readable instructions 309 to client processor 303 via communication link 307.

The client-server embodiment of system 300 may be implemented using well-known programming methods. In an embodiment, the first subset of processor readable instructions 309 may be executed on the server processor 302 as a CGI script. A CGI script is a software program designed to produce dynamic content, usually a HTML encoded web page, in response to user request. CGI scripts are commonly written in computer languages such as C++, Java™, Perl, or Python.

In conjunction with the use of a CGI script on the server processor 302, the second subset of processor readable instructions 309 may be executed on the client processor 303 as a Java™ applet. Java™ is a platform independent programming language. A Java™ applet may be executed by any device which contains a Java™ virtual machine or a Java™ enabled web-browser. Using the Java™ programming language for the second set of processor readable instructions 309 allows the method of the invention to be implemented on many different types of client processors.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The invention claimed is:

1. A method for creating multimedia meeting minutes, comprising the steps of:
   receiving a notation from a notetaking user during a meeting;
   automatically recording an index value for the notation, the index value based on the context of the notation;
   receiving a quantity of multimedia information from at least one multimedia source;
   automatically selecting at least one portion of the quantity of the multimedia information based on the index value of the notation;
   automatically creating an association between the notation and the selected portion of the quantity of multimedia information, where the association enables access to the selected portion of the quantity of multimedia information; and
   storing the notation and the association for retrieval at a future time, where the future time is one of a time during the meeting and a time after the meeting,
   wherein a single action by the notetaking user initiates the steps of receiving the notation, recording, selecting, creating, and storing.

2. The method of claim 1, where:
   the quantity of multimedia information includes information for accessing a second quantity of multimedia information.

3. The method of claim 1, where:
   the steps of receiving a notation, recording, receiving a quantity of information, selecting, creating, and storing are repeated for a plurality of notations; further including the step of:
   transmitting the plurality of notations and their respective associations via an electronic network to at least one user for future retrieval by said user.

4. The method of claim 3, wherein:
   the plurality of the notations and their respective associations are transmitted via an electronic mail message.

5. The method of claim 3, further including the steps of:
   receiving a quantity of information from a user; and
   revising at least one of the stored notations and its respective association in response to the quantity of information received from the user.

6. The method of claim 5, where:
   the quantity of information received from a user includes a copy of at least a portion of the plurality of notations, where the user has altered at least one of the plurality of notations to indicate the desired revision.

7. The method of claim 3, further including the steps of:
   receiving a quantity of information from a user;
   revising at least one of the stored notations and its respective association in response to the quantity of information received from the user; and wherein:
   in the step of transmitting, the plurality of notations and the respective notations are transmitted as an electronic mail message via an electronic mail network, the electronic mail message containing a predetermined electronic mail address; and
   in the step of receiving a quantity of information from a user, the quantity of information is received via the predetermined electronic mail address.

8. The method of claim 7, where:
   the quantity of information received from the user includes a copy of at least a portion of the plurality of notations, where the user has altered at least one of the plurality of notations to indicate the desired revision.

9. The method of claim 1, where:
   the notation is text.

10. The method of claim 1, where:
    the index value indicates a time when the notation was received.

11. The method of claim 1, where:
    the step of selecting includes using the index value to select a portion of the quantity of multimedia information received at the time the notation was received.

12. The method of claim 1, where:
    the association enables access to a slide.

13. The method of claim 1, further comprising transmitting a plurality of notations and their respective associations via an electronic network to at least two users for future retrieval by said users.

14. An apparatus containing a set of processor readable instructions and communicating with a programmable device through at least one communication link, wherein the programmable device including at least one processor responsive to the set of processor readable instructions, wherein the set of instructions directs the programmable device to perform a method for creating multimedia meeting minutes, the method comprising the steps of:
    receiving a plurality of notations from a notetaking user;
    recording an index value for each of the plurality of notations, the index value based on the context of each notation;
    receiving a quantity of multimedia information from at least one multimedia source;
    selecting at least one portion of the quantity of the multimedia information based on the index value of each notation;
    creating an association between each of the plurality of notations and the selected portion of the quantity of multimedia information, where the association enables access to the selected portion of the quantity of multimedia information;
    storing the plurality of notations and the respective associations for retrieval at a future time, where the future time is one of a time during the meeting and a time after the meeting;
    transmitting the plurality of notations and their respective associations via an electronic network to at least one user.

15. The apparatus of claim 14, where:
    the apparatus communicates a first subset of instructions to a first processor within the programmable device, the first subset of instructions directing the first processor to perform a first portion of the steps of the method; and
    the apparatus communicates a second subset of instructions to a second processor within the programmable device, the second subset of instructions directing the second processor to perform a second portion of the steps of the method.

16. The apparatus of claim 14, where the method further includes the steps of:
    receiving a copy of at least a portion of the plurality of notations and the respective associations from at least one user, where the copy includes an alteration to at least one of the notations;
    modifying the stored plurality of notations and the respective associations in accordance to the alteration; and wherein, the second copy of at least a portion of the plurality of notations is received via an electronic mail message.

17. The apparatus of claim 16, where:

the first subset of instructions directs the first processor to perform the steps of receiving a plurality of notations and recording an index value; and the second subset of instructions directs the second processor to perform the steps of receiving a quantity of multimedia information, selecting at least one portion of the quantity, creating an association, storing the plurality of notations, transmitting the plurality of notations, receiving a copy of at least a portion of the plurality of notations, and modifying the stored plurality of notations.

18. The method of claim 14, where:

the future time is during the meeting.

19. The method of claim 18, where:

the association enables access to a slide.

* * * * *